G. SPANN.
DEVICE FOR USE IN THE MANUFACTURE OF PISTON RINGS.
APPLICATION FILED OCT. 26, 1920.
1,413,623.
Patented Apr. 25, 1922.
3 SHEETS—SHEET 1.
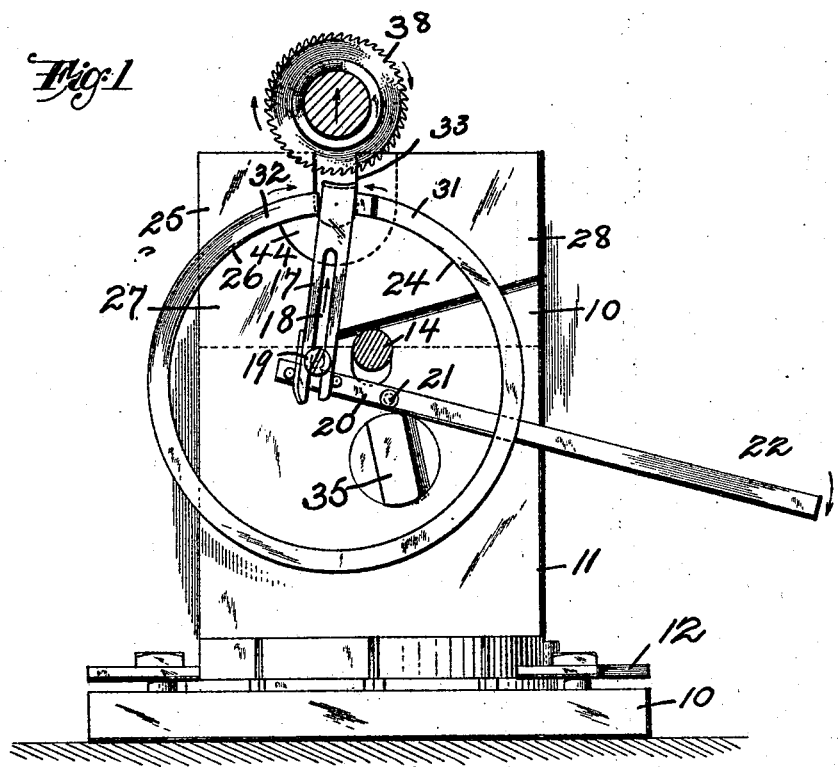
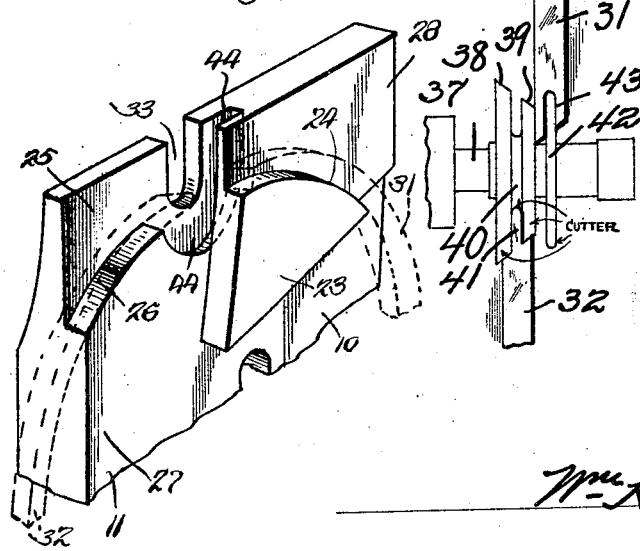
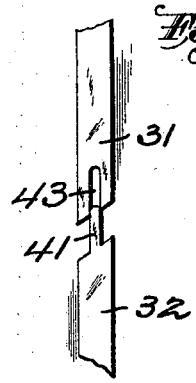
INVENTOR.
George Spann,
BY
Wm H Canfield
ATTORNEY.

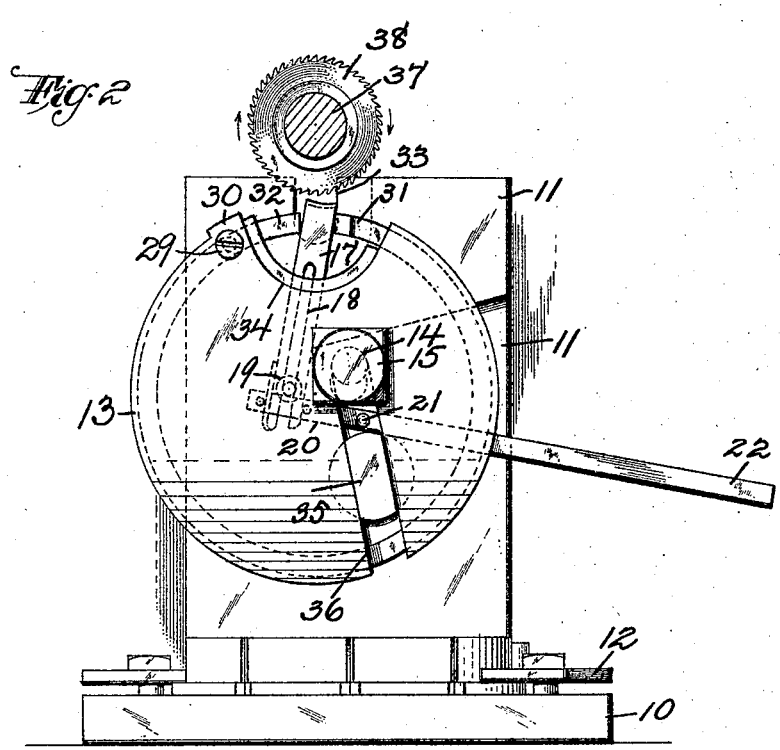
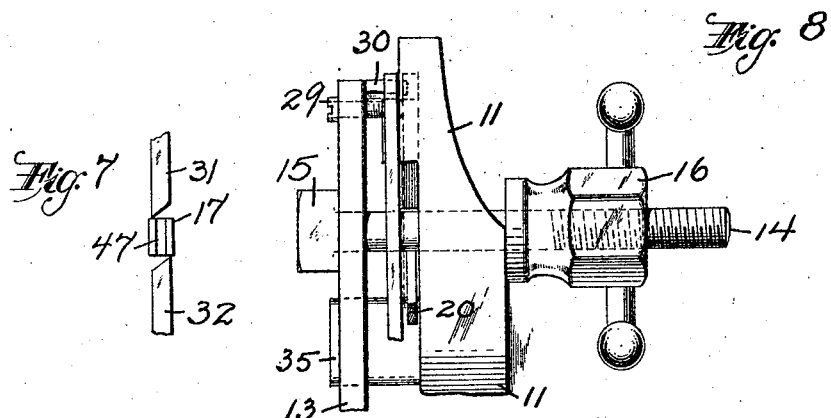

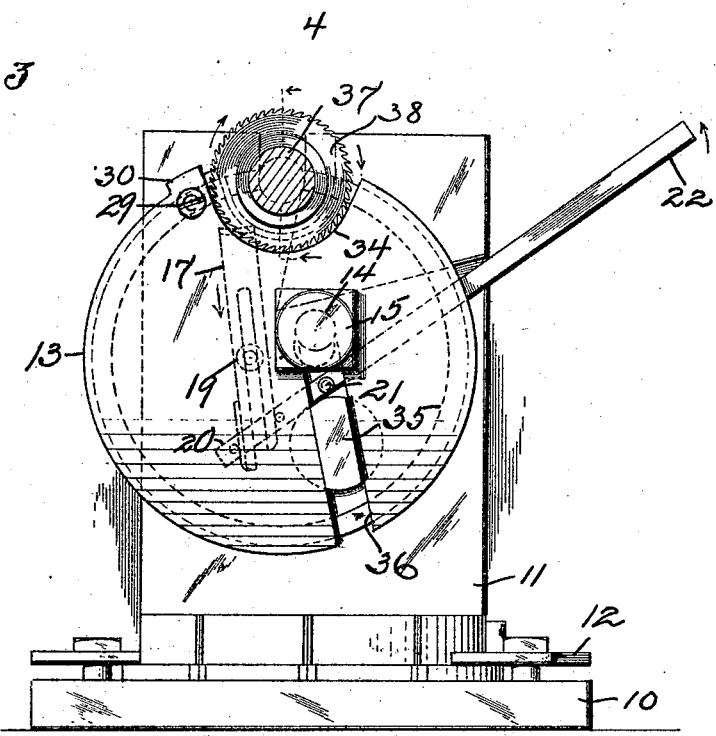
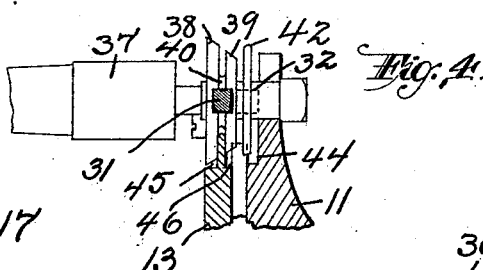
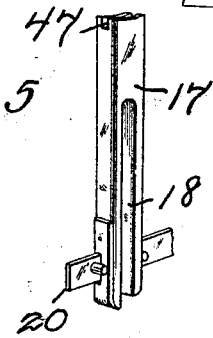
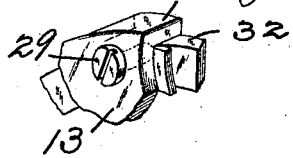

UNITED STATES PATENT OFFICE.

GEORGE SPANN, OF NEWARK, NEW JERSEY.

DEVICE FOR USE IN THE MANUFACTURE OF PISTON RINGS.

1,413,623.

Specification of Letters Patent. Patented Apr. 25, 1922.

Application filed October 26, 1920. Serial No. 419,582.

*To all whom it may concern:*

Be it known that I, GEORGE SPANN, a citizen of the United States, and a resident of Newark, county of Essex, and State of New Jersey, have invented certain new and useful Improvements in Devices for Use in the Manufacture of Piston Rings, of which the following is a specification.

This invention relates to an improved jig or clamp for use in the manufacture of piston rings, the clamp being constructed to hold the ring so that suitable cutters or milling tools can be used on both ends of the ring simultaneously, if desired, so that the joint at the two ends of the rings can be finished in one operation.

The invention provides a clamp of this kind in which a gage is embodied, which gage spaces the ends of the ring circumferentially, and while so gaged the ring is clamped to force and hold the spaced ends out of alignment so that cutters mounted on an arbor or shaft can be forced simultaneously through the ends of the ring to form a joint, preferably a tongue and groove joint.

The invention also resides in certain details of construction which are fully described further on in this specification and also embodied in the claims.

The invention is illustrated in the accompanying drawings, in which Figure 1 is a face view of the rear side of the device with a plate or jaw on the back removed. Figure 2 is a similar view with the plate in place. Figure 3 is a view similar to Figure 2 with the gage withdrawn and the cutters completing their cutting. Figure 4 is a detail section on line 4—4 in Figure 3. Figure 5 is a detail perspective view of the gage, and Figure 6 is a detail view of the top part of the rear plate or jaw. Figure 7 shows the ends of the ring against the gage, and Figure 8 is a side view of the top part of the device. Figure 9 is a top view showing the cutters and the ends of the ring when the cutting is completed, and Figure 10 is a view of the ends of the ring fitted together after they are cut. Figure 11 is a perspective view of the upper part of Figure 1, with the gage and cutters omitted.

The device is preferably made in the form of a standard which can be placed in milling machines and the like, but its movement and relation to such machinery is not included in this description as it is no part of this invention.

The form shown comprises a base 10 on which the standard 11 is rotatably secured, and clamps 12 are adapted to hold the standard in its proper adjusted position. The standard 11 provides one jaw of a clamp, it being the fixed element and is adapted to have the piston ring placed against its inner face preparatory to its being clamped in position. The other jaw of the clamp comprises a plate 13 which is on the rear of the standard 11, this plate forming the other jaw of the clamp, suitable means being provided for drawing them together and permitting them to be separated.

The form shown consists of a bolt 14 which has a head 15 on the rear end of it, and a suitable hand nut 16 is utilized for tightening it up, and thus the movable jaw of the clamp is placed against the standard. The function of the device is to permit the rapid insertion and placing in position of a piston ring with its ends separated, then clamping this piston ring so that these separated ends are then clamped in a position in which they are out of alignment, the structure being adapted to permit the movement of rotary cutters in contact with these ends simultaneously, so that when the cutting is completed one of the ends of the piston ring has a tongue and the other end has a groove into which the tongue fits to make a tight joint.

Then the piston ring is placed in the cylinder. This permits the piston rings to be made rapidly and consequently with economy.

On the rear face of the standard 11 is a gage 17 that is slidable between the two jaws, in the form shown the gage being slotted at 18, which slotted part rides over a screw 19, and a lever 20, pivoted at 21, extends beyond the side of the standard so as to form a handle part 22 by means of which it can be operated. When it is in its raised position the gage 17 rests against the edge of a ledge or off-set portion 23, the top edge 24 of which is curved for purposes to be hereinafter described and which is raised above the face 25, immediately below which is a shoulder 26, the curved upper surface of which is also adapted to receive the inner face of the piston ring to be cut, so that the part 23 is raised above the part 27, the part 27 in turn being raised or off-set above the face 25.

The plate 13 has its rear face adapted to fit against the piston ring above the curved surface 24 to clamp it against the face 28, and on the other side of the gage it is provided with a projecting part, in the form shown this consisting of a screw 29 which bears against the piston ring and pushes it over until it is pressed against the face 25, the shoulder 30 extending over the ring to hold the ring down tightly against the shoulder 26. It will thus be seen that the two ends 31 and 32 of the piston ring will not be in alignment.

The top part of the standard is provided with a slot 33 and the plate 13 is provided with a recess 34. When a piston ring is to be placed in the clamp, the gage is raised and the piston ring, which is split with tapered ends 31 and 32, is placed on opposite sides of the gage 17, which has been previously slid up to the position shown in Figure 1, this gage defining the space that separates these ends circumferentially, as will be seen from an inspection of Figure 7. The jaw 13 is then slid over the bolt 14 and also over the stud 35, the plate 13 being provided with a slot 36 so that the jaw can be placed in position without entirely removing the bolt 14.

The nut 16 is then screwed up and the two ends of the piston ring are separated transversely by being pressed against the inner face of the standard 11 so that the ends of the piston ring are held in such position, that is, out of alignment and substantially parallel, as shown in Figure 9, as will be clearly seen from Figure 2.

The handle 22 is then swung upward, which pulls the gage 17 down, as will be seen in Figure 3. The piston ring is now ready for operation by the cutters.

The cutters are mounted on a suitable arbor 37, two of these cutters 38 and 39 being tapered and having a cutter 40 between them, this cutter 40 being preferably curved so that it forms the end 32 of the piston ring so that it is provided with a tongue 41, which will be seen from Figure 9, and a cutter 42, which is preferably provided with a rounded surface, enters the end 31 of the piston ring and provides it with a slot 43, and since the ends of the piston ring were tapered when they were split, as in Figure 7, the piston ring when thus ground or cut can have its ends fitted together, as shown in Figure 10, so that a unitary structure is provided, but it is made with a joint that is substantially gas-tight and forms a substantially complete closure when placed around the piston and within the cylinder. Any suitable mechanism for moving the cutters down on the ring or for moving the whole jig upward until the ring is in contact with the cutter can be used.

The standard 11 can be recessed, as at 44 (see Figure 4), and the plate 13 has recesses 45 and 46, and, as will be seen from Figure 5, the gage can be provided with a slot 47, all these providing for the descent of the cutter without engaging these parts so that the cutter engages only the ends of the piston ring.

It will be evident that modifications can be made in the proportion and also in the assembling of the parts without departing from the scope of the invention.

I claim:

1. A device for use in making piston rings comprising a clamp constructed so as to hold the ends of a split ring separated circumferentially and out of alignment, in combination with a set of cutters disposed so as to simultaneously shape said ends so that they interlock when cut.

2. A device for use in making piston rings comprising a gage for positioning the ends of a piston ring so that they are separated circumferentially, a clamp to move said ends and hold them so that they are substantially parallel and out of alignment, said gage being supported so that it can be retreated from its gaging position, in combination with a set of cutters to simultaneously cut said ends so that a tongue is formed on one and a groove on the other, the portions of the clamp adjacent said ends being recessed to receive said cutters.

3. A device for use in making piston rings comprising a clamp constructed so as to hold the ends of a piston ring out of alignment and separated circumferentially, one member of the clamp adjacent said ends having a slot extending adjacent to and between said ends to receive the arbor of a cutter.

4. A device for use in making piston rings comprising a clamp to hold a piston ring with its ends separated circumferentially and transversely, and with said ends exposed for action by cutters, a gage movable in said clamp to space the ends of the ring before they are clamped and to permit its withdrawal from gaging position, the clamp being recessed to permit the introduction of cutters between said ends.

5. A device for use in making piston rings comprising a clamp to hold a piston ring with its ends separated circumferentially and transversely, and with said ends exposed for action by cutters, in combination with an arbor on which a cutter for grooving one of said ends and cutters for forming a tongue on the other of said ends are mounted.

6. A device for use in making piston rings comprising a standard, a bolt in said standard, a plate with a slot to go over the bolt to permit a transverse movement of the plate, the standard and plate forming the jaws of a clamp, a gage to position a piston ring between the jaws, the plate having a projection on one side of said gage so that when the ends of the ring are clamped they are out of alignment to permit the said ends being simultaneously operated on by a set of cutters.

7. A device for use in making piston rings comprising a standard with a slot in its top edge, a bolt passing through the standard, a nut on the bolt, a stud on the standard, a plate having a slot to receive the stud and the bolt and having a recessed part adjacent to the slot of the standard, a gage adapted to be projected into or withdrawn from the space between the slotted and recessed portions, the opposed faces of the standard and plate alongside the slot of the standard being off-set to clamp the ends of a piston ring resting against the gage so that said ends will be substantially parallel and out of alignment, whereby an arbor supplied with cutters can cut said ends simultaneously to form a tongue and groove joint on the ring, the recessed parts permitting the descent of said cutters between the standard and the plate.

In testimony that I claim the foregoing, I have hereto set my hand, this 25th day of October, 1920.

GEORGE SPANN.